（12）United States Patent
Deevi et al.

(10) Patent No.: US 7,569,510 B2
(45) Date of Patent: Aug. 4, 2009

(54) CATALYSTS TO REDUCE CARBON MONOXIDE SUCH AS IN THE MAINSTREAM SMOKE OF A CIGARETTE

(75) Inventors: Sarojini Deevi, Midlothian, VA (US); Padmanabha Reddy Ettireddy, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 0 days.

(21) Appl. No.: 11/698,192

(22) Filed: Jan. 26, 2007

(65) Prior Publication Data

US 2007/0204870 A1      Sep. 6, 2007

Related U.S. Application Data

(60) Provisional application No. 60/776,679, filed on Feb. 27, 2006.

(51) Int. Cl.
  *B01J 21/12* (2006.01)

(52) U.S. Cl. .................. 502/240; 502/180; 502/325; 502/350; 502/355; 502/304; 131/331; 131/360

(58) Field of Classification Search ............ 502/180, 502/240, 325, 350, 355, 304; 131/331, 360
See application file for complete search history.

(56) References Cited

U.S. PATENT DOCUMENTS

| 4,317,460 | A |   | 3/1982 | Dale et al. |
| 4,524,051 | A |   | 6/1985 | Wright et al. |
| 4,675,308 | A | * | 6/1987 | Wan et al. .................. 502/304 |
| 4,855,274 | A |   | 8/1989 | Upchurch et al. |
| 4,991,181 | A |   | 2/1991 | Upchurch et al. |
| 5,322,075 | A |   | 6/1994 | Deevi et al. |
| 5,591,368 | A |   | 1/1997 | Fleischhauer et al. |
| 5,934,289 | A |   | 8/1999 | Watkins et al. |
| 6,053,176 | A |   | 4/2000 | Adams et al. |
| 6,799,578 | B2 |  | 10/2004 | Snaidr et al. |
| 7,165,553 | B2 |  | 1/2007 | Luan et al. |
| 2002/0062834 | A1 |   | 5/2002 | Snaidr et al. |
| 2003/0154993 | A1 |   | 8/2003 | Paine, III et al. |
| 2003/0166466 | A1 |   | 9/2003 | Hoke et al. |
| 2003/0187294 | A1 |   | 10/2003 | Hagemeyer et al. |
| 2003/0204102 | A1 | * | 10/2003 | Weisbeck et al. ........... 549/534 |
| 2004/0007242 | A1 |   | 1/2004 | Finlay et al. |
| 2004/0138051 | A1 | * | 7/2004 | Shan et al. .................... 502/60 |
| 2004/0168695 | A1 |   | 9/2004 | Snaidr et al. |
| 2004/0173231 | A1 |   | 9/2004 | Bowen et al. |
| 2004/0250827 | A1 |   | 12/2004 | Deevi et al. |

FOREIGN PATENT DOCUMENTS

| EP | 0306945 |   | 3/1989 |
| GB | 1116585 A |   | 6/1986 |
| WO | WO 95/51401 | * | 11/1998 |
| WO | WO 2005/118133 A2 |   | 12/2005 |

OTHER PUBLICATIONS

Rand et al., "Carbon-Ceramic Alloys", *Design and Control of Structure of Advanced Carbon Materials for Enhanced Performance*, 319-337 (2001) Kluwer Academic Publishers, Netherlands.
International Search Report and Written Opinion for International Patent Application No. PCT/IB2007/001775.
International Preliminary Report on Patentability dated Sep. 2, 2008 for PCT/IB2007/001775.

* cited by examiner

*Primary Examiner*—Elizabeth D Wood
(74) *Attorney, Agent, or Firm*—Buchanan Ingersoll & Rooney PC

(57) ABSTRACT

Catalysts for the conversion, or oxidation, of carbon monoxide to carbon dioxide. Cigarettes with filters containing the catalysts have acceptable resistance to draw. Additionally, the catalysts can be used to reduce the concentration of carbon monoxide from a vehicle exhaust emission, a gas used in a $CO_2$ laser, a gas used in a fuel cell and/or ambient air undergoing air filtration.

8 Claims, 2 Drawing Sheets

US 7,569,510 B2

CATALYSTS TO REDUCE CARBON MONOXIDE SUCH AS IN THE MAINSTREAM SMOKE OF A CIGARETTE

CROSS REFERENCE TO RELATED APPLICATIONS

The present application claims priority under 35 U.S.C. 119 to U.S. Provisional Patent Application No. 60/776,679 filed on Feb. 27, 2006, the entire content of which is hereby incorporated by reference.

SUMMARY

In one embodiment, a catalyst catalytically active for oxidation of carbon monoxide comprises noble metal nanoparticles on non-noble metal oxides incorporated in a porous support.

In another embodiment, a method of making a catalyst catalytically active for oxidation of carbon monoxide comprises treating a catalyst comprising noble metal nanoparticles on non-noble metal oxides incorporated in a support to develop porosity in the support.

In yet another embodiment, a catalyst catalytically active for oxidation of carbon monoxide comprises noble metal nanoparticles on non-noble metal oxides incorporated in a silica gel support.

In a further embodiment, a method of making a catalyst catalytically active for oxidation of carbon monoxide comprises incorporating noble metal nanoparticles on non-noble metal oxides in a silica gel support.

DETAILED DESCRIPTION

Figure 1:
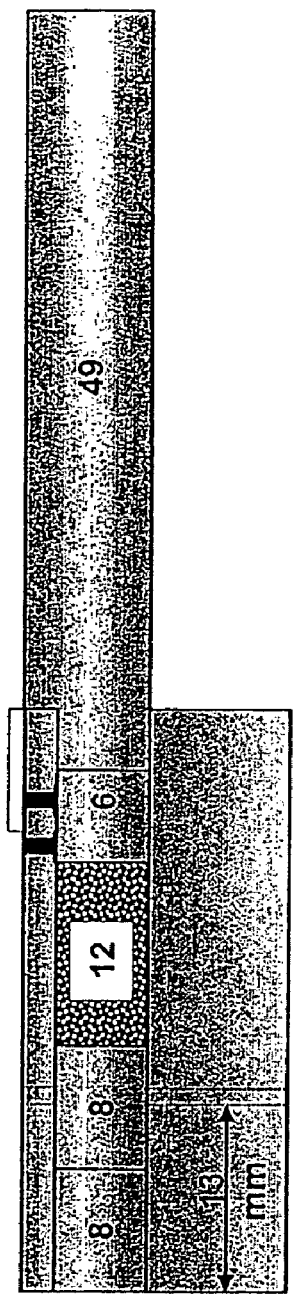
FIG. 1 illustrates the structure of a 34 mm long cigarette filter having adjacent sections of an 8 mm cellulose acetate (CA) filter segment, an 8 mm CA segment, a 12 mm cavity containing catalyst, and a 6 mm CA segment, the filter attached via tipping paper to a 49 mm long tobacco rod.

Smoking articles, such as cigarettes or cigars, produce both mainstream smoke during a puff and sidestream smoke during static burning. One constituent of both mainstream smoke and sidestream smoke is carbon monoxide (CO). The reduction of carbon monoxide in smoke is desirable.

Catalysts for the conversion, or oxidation, of carbon monoxide to carbon dioxide are provided. The catalyst is preferably capable of room temperature oxidation of carbon monoxide. Accordingly, the catalyst can be incorporated into cigarette filter material. The catalyst can also be used to reduce the concentration of carbon monoxide from a vehicle exhaust emission, a gas used in a $CO_2$ laser, a gas used in a fuel cell and/or ambient air undergoing air filtration. The catalyst may be incorporated into a vehicle exhaust emissions system in an amount effective to oxidize carbon monoxide to carbon dioxide. The catalyst may also be used for emissions reduction in the cold starting of an automobile engine in an amount effective to oxidize carbon monoxide to carbon dioxide. The catalyst may be incorporated into a $CO_2$ laser in an amount effective to oxidize carbon monoxide to carbon dioxide. The catalyst can be incorporated into a fuel cell in an amount effective to oxidize carbon monoxide to carbon dioxide. The catalyst can be used in an air filter for the conversion of carbon monoxide and/or indoor volatile organic compounds.

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing the cigarette smoke through the mouth end of the cigarette. The cigarette may also be smoked by other means. For example, the cigarette may be smoked by heating the cigarette and/or heating using electrical heater means, as described in commonly-assigned U.S. Pat. Nos. 6,053,176; 5,934,289; 5,591,368 and 5,322,075.

The term "mainstream" smoke refers to the mixture of gases passing down the tobacco rod and issuing through the filter end, i.e., the amount of smoke issuing or drawn from the mouth end of a cigarette during smoking of the cigarette.

In addition to the constituents in the tobacco, the temperature and the oxygen concentration are factors affecting the formation and reaction of carbon monoxide and carbon dioxide. The total amount of carbon monoxide formed during smoking comes from a combination of three main sources: thermal decomposition (about 30%), combustion (about 36%) and reduction of carbon dioxide with carbonized tobacco (at least 23%). Formation of carbon monoxide from thermal decomposition, which is largely controlled by chemical kinetics, starts at a temperature of about 180° C. and finishes at about 1050° C. Formation of carbon monoxide and carbon dioxide during combustion is controlled largely by the diffusion of oxygen to the surface ($k_a$) and via a surface reaction ($k_b$). At 250° C., $k_a$ and $k_b$ are about the same. At about 400° C., the reaction becomes diffusion controlled. Finally, the reduction of carbon dioxide with carbonized tobacco or charcoal occurs at temperatures around 390° C. and above.

During smoking there are three distinct regions in a cigarette: the combustion zone, the pyrolysis/distillation zone, and the condensation/filtration zone. While not wishing to be bound by theory, it is believed that catalysts can target the various reactions that occur in different regions of the cigarette during smoking.

First, the combustion zone is the burning zone of the cigarette produced during smoking of the cigarette, usually at the lighted end of the cigarette. The temperature in the combustion zone is in the range from about 700° C. to about 950° C., and the heating rate can be as high as 500° C./second. Because oxygen is being consumed in the combustion of tobacco to produce carbon monoxide, carbon dioxide, water vapor, and various organics, the concentration of oxygen is low in the combustion zone. The low oxygen concentrations coupled with the high temperature leads to the reduction of carbon dioxide to carbon monoxide by the carbonized tobacco. The combustion zone is highly exothermic and the heat generated is carried to the pyrolysis/distillation zone.

The pyrolysis zone is the region behind the combustion zone, where the temperatures range from about 200° C. to about 600° C. The pyrolysis zone is where most of the carbon monoxide is produced. The major reaction is the pyrolysis (i.e., thermal degradation) of the tobacco that produces carbon monoxide, carbon dioxide, smoke components and/or carbon using the heat generated in the combustion zone.

In the condensation/filtration zone the temperature ranges from ambient to about 60° C. The major process in this zone is the condensation/filtration of the smoke components. Some amount of carbon monoxide and carbon dioxide diffuse out of the cigarette and some oxygen diffuses into the cigarette. The partial pressure of oxygen in the condensation/filtration zone does not generally recover to the atmospheric level. In the condensation/filtration zone, the catalyst can promote oxidation of carbon monoxide to carbon dioxide in the presence of oxygen, at temperatures from ambient to about 60° C.

Incorporating catalysts in a preferred cigarette filter discussed herein results in minimal changes in smoke chemistry, minimizes additional products due to combustion, and requires only small amounts of catalyst. Catalysts tested for potential inclusion in cigarette filters include gold/titania deposited on activated carbon (PICA Carbon, Levallois, France; mesh size of 20×50 mesh or 40×60 mesh), carbon beads (100-700 microns in diameter), and silica gel beads.

Figure 2:
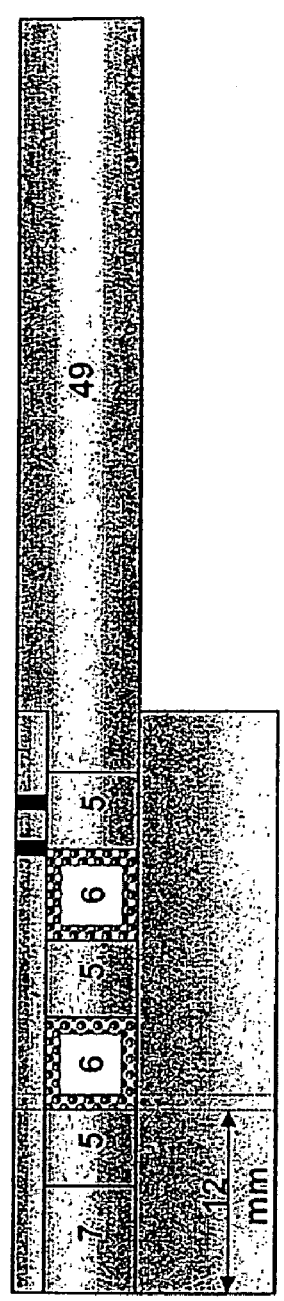
FIG. 2 illustrates the structure of a 34 mm long dual cavity cigarette filter having adjacent sections of a 7 mm CA filter segment, a 5 mm CA segment, a 6 mm cavity containing catalyst, a 5 mm CA segment, a 6 mm cavity containing catalyst, and a 5 mm CA segment, the filter attached via tipping paper to a 49 mm long tobacco rod.

The cigarette of FIG. 1 contains a 49 mm long tobacco rod and a 34 mm long filter having adjacent sections of an 8 mm CA filter segment, an 8 mm CA segment, a 12 mm cavity containing catalyst, and a 6 mm CA segment. The cigarette of FIG. 2. contains a 49 mm long tobacco rod and a 34 mm long dual cavity filter having adjacent sections of a 7 mm CA filter segment, a 5 mm CA segment, a 6 mm cavity containing catalyst, a 5 mm CA segment, a 6 mm cavity containing catalyst, and a 5 mm CA segment. It is contemplated that the catalysts disclosed herein may be contained in only one of the dual cavities or both of the dual cavities. In FIG. 1 and FIG. 2, the filter is attached to the tobacco rod via tipping paper. Flavor may optionally be incorporated into the filter, preferably downstream of the catalyst.

The catalysts disclosed herein, incorporated in cigarette filters, can be effective for the removal of carbon monoxide, nitric oxide, and/or provide reduction in total particulate matter (TPM). However, the size of the catalyst particles should be controlled such that fine catalyst particles, which can result in high resistance to draw (RTD), possibly as a result of clogging of support pores, are not incorporated. In order to further avoid high RTD, the catalysts are preferably anchored in porous supports, which comprise interconnected pores that extend from one surface of a support to another. The catalyst is preferably anchored on external surfaces of the support and on the periphery of the pores in order to maximize contact between the catalyst and carbon monoxide.

Thus, the catalyst for the conversion of carbon monoxide to carbon dioxide may comprise noble metal nanoparticles on non-noble metal oxides incorporated in a porous support. Accordingly, as used herein, the term "catalyst" refers to noble metal nanoparticles on non-noble metal oxides. The catalyst is incorporated in a porous support. Preferably, the support is macroporous, which refers to a material with a pore size of about 500 Å or larger. The support may comprise, for example, carbon beads or activated carbon, preferably macroporous carbon beads or macroporous activated carbon. The carbon beads may comprise phenolic resin, for example carbonized phenolic resin. Alternatively, the support may comprise mesoporous silica, mesoporous titania, mesoporous alumina, or mesoporous ceria. Mesoporous refers to a material with a pore size of about 20-500Å. The mesoporous silica may comprise, for example, SBA-15, SBA-16, MCM-41, or MCM-48. Examples of noble metal nanoparticles suitable for use in the catalyst include, for example, gold, palladium, platinum and mixtures thereof. Examples of non-noble metal oxides suitable for use in the catalyst include, for example, titania, alumina, ceria, zirconia, iron oxide, zinc oxide, magnesium oxide, and mixtures thereof. The noble metal nanoparticles on non-noble metal oxides may comprise, for example, 1-5 weight % gold-ceria, 2-5 weight % palladium-ceria, silver/silver oxide-ceria, copper oxide/zinc oxide-ceria, 20 weight % copper oxide-80 weight % Hombikat titania, 10 weight % copper oxide-10 weight % manganese oxide-80 weight % Hombikat titania. Preferably, the noble metal nanoparticles on non-noble metal oxides comprises 0.5-5 weight % gold-titania, more preferably 1-2 weight % gold-titania.

"Nanoparticles" refers to a class of materials whose distinguishing feature is that their average diameter, particle or other structural domain size is below about 100 nanometers. The nanoparticles can have an average particle size less than about 100 nm, preferably less than about 50 nm, more preferably less than about 15 nm, even more preferably less than about 10 nm, and most preferably less than about 7 nm. Nanoparticles have very high surface area to volume ratios, which makes them attractive for catalytic applications.

A catalyst comprising noble metal nanoparticles on non-noble metal oxides incorporated in a support may be treated to develop porosity in the support. The treatment to develop porosity preferably comprises an oxidation reaction at high temperatures, with an oxidizing agent such as, for example, steam, carbon dioxide, air and mixtures thereof. By treating the catalyst to develop porosity in the support, as opposed to depositing noble metal nanoparticles on non-noble metal oxides on a support, the pores of the support are not clogged. The catalyst is treated to develop porosity in the support, such that the support is preferably macroporous. The support may comprise, for example, carbon beads or activated carbon. The carbon beads may comprise phenolic resin, for example, carbonized phenolic resin. Alternatively, the support may comprise, for example, silica, titania, alumina, or ceria, which is treated to develop mesoporous silica, mesoporous titania, mesoporous alumina, or mesoporous ceria, respectively. Examples of noble metal nanoparticles suitable for use in the catalyst include, for example, gold, palladium, platinum and mixtures thereof. Examples of non-noble metal oxides suitable for use in the catalyst include, for example, titania, alumina, ceria, zirconia, iron oxide, zinc oxide, magnesium oxide, and mixtures thereof. The noble metal nanoparticles on non-noble metal oxides may comprise, for example, 1-5 weight % gold-ceria, 2-5 weight % palladium-ceria, silver/silver oxide-ceria, copper oxide/zinc oxide-ceria, 20 weight % copper oxide-80 weight % Hombikat titania, 10 weight % copper oxide-10 weight % manganese oxide-80 weight % Hombikat titania. Preferably, the noble metal nanoparticles on non-noble metal oxides comprises 0.5-5 weight % gold-titania, more preferably 1-2 weight % gold-titania.

The amount of catalyst included in the cigarette filter can be varied. For example, up to about 300 mg of catalyst can typically be used in a cigarette or other smoking article. For example, within the usual range, amounts such as about 20, 30, 50, 75, 100, 150, 200, or 250 mg of catalyst can be used in a cigarette. The amount of catalyst used in a cigarette depends on the amount of constituents in the tobacco smoke, and the amount of the constituents that is desired to be removed from the tobacco smoke.

The effectiveness of the catalyst incorporated into a cigarette filter component may be impacted by catalyst diameter, with smaller catalyst likely being more efficient. However, as noted above, the size of the catalyst particles should be controlled such that fine catalyst particles, which can result in high RTD, are not incorporated. Thus, the catalyst particle size is preferably approximately 50 to 800 microns, more preferably approximately 300 to 500 microns, preferably at an activation level equivalent to a BET surface area in the range of 1,000 to 1,600 m$^2$/g, more preferably in the range of 1,100 to 1,300 m$^2$/g.

Metal nanoparticles on metal oxides, preferably noble metal nanoparticles on non-noble metal oxides, can be formed by such methods as, for example, deposition-precipitation or co-precipitation or in situ upon heating a mixture of suitable metal precursor compounds. For example, a metal precursor, such as gold hydroxide, can be dissolved in a suitable solvent, such as alcohol, and mixed with a second metal precursor, such as titanium pentane dionate. The metal precursor mixture can be heated to a relatively low temperature, for example about 200-400° C., wherein thermal decomposition of the metal precursors results in the formation of metal nanoparticles on metal oxide particles that can range in size from about 100 nm to about 500 nm.

Alternatively, nanoparticles can be formed in situ upon heating a mixture of a suitable metal precursor compound and support. By way of example, a metal precursor compound, such as gold hydroxide, can be dissolved in a suitable solvent, such as alcohol, and mixed with a dispersion of a support material, such as colloidal silica, which can be gelled in the presence of an acid or base and allowed to dry such as by drying in air. Acids and bases that can be used to gel the colloidal mixture include hydrochloric acid, acetic acid, formic acid, ammonium hydroxide and the like. When an acid containing chlorine is used to gel the colloidal mixture, preferably the gel is washed in de-ionized water in order to reduce the concentration of chloride ions in the gel. The colloidal support material can be any suitable concentration such as, for example, 10-60 weight %, e.g., a 15 weight % dispersion or a 40 weight % dispersion. During or after gelation, the metal precursor-colloidal silica mixture can be heated to a relatively low temperature, for example 200-400° C., wherein thermal decomposition of the metal precursor results in the formation of metal nanoparticles or metal oxides on silica support particles. In place of colloidal silica, colloidal titania or a colloidal silica-titania mixture can be used as a support. Colloidal support particles can range in size from about 10 nm to about 500 nm.

In particular, 2 weight % Au—$TiO_2$ Hombikat catalyst can be prepared with Hombikat titanium dioxide, manufactured by Sachtleben, Duisburg, Germany, by dissolving 30 weight % tetrachloroauric acid solution in deionized water and dispersing Hombikat in the solution. An excess of solid urea is also added to the solution. The resulting mixture is heated slowly to 90-95° C. on a hot plate with vigorous stirring. No change in pH of the solution is observed until the temperature of the solution reaches 90-95° C., at which time the pH of the solution increases slowly, attaining a final value of 7-8. Heating is further continued at this pH for 1 hour in order to complete the precipitation of metal oxides. The resulting precipitates are filtered and washed with deionized water. The resulting solid is then dried at room temperature. The catalyst is reduced at 150-200° C. for 20 minutes in the presence of 3.6% CO/balance Ar.

Figure 3:
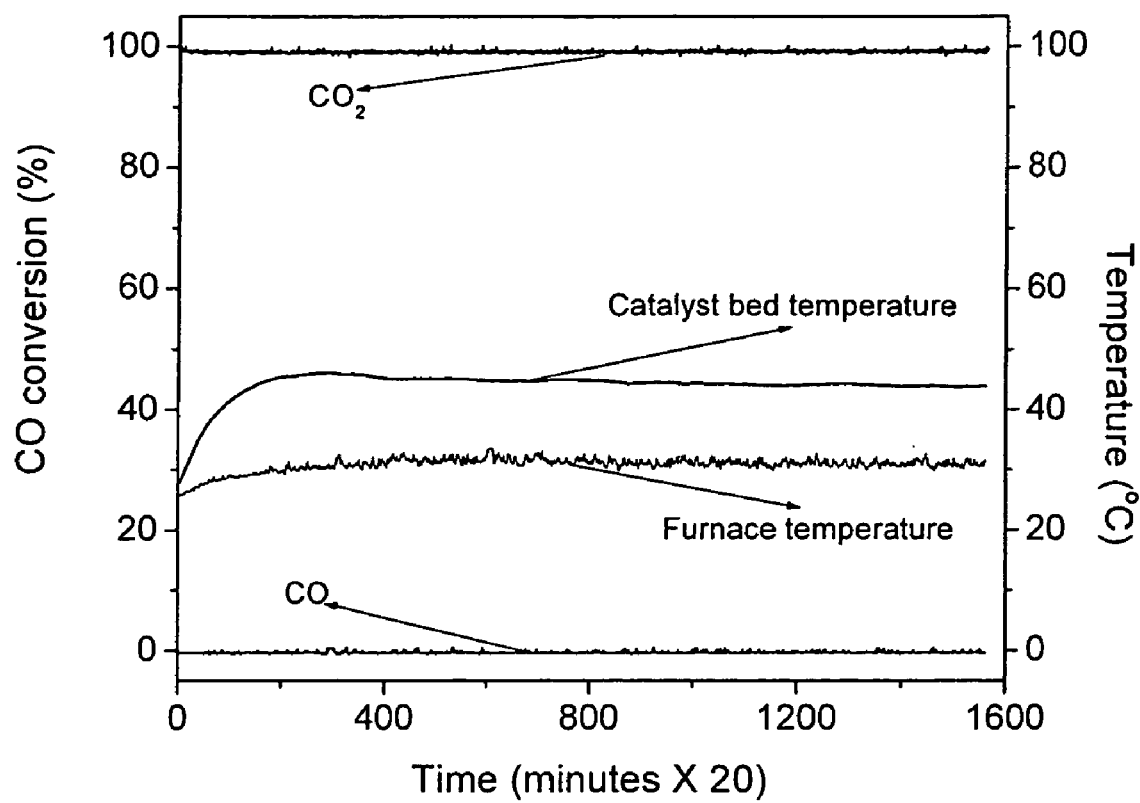
FIG. 3 shows the results of carbon monoxide oxidation at room temperature using 100 mg of 2 weight % Au—$TiO_2$ Hombikat catalyst.

Carbon monoxide oxidation using 100 mg of the 2 weight % Au—$TiO_2$ Hombikat catalyst was tested with 1 L/minute of 3.6% CO/21% $O_2$/balance Ar at room temperature. The carbon monoxide oxidation initiated at room temperature and 100% of the carbon monoxide was oxidized. Results can be found in FIG. 3.

As catalysts may be deactivated by cigarette smoke as a result of active components in cigarette smoke, further testing was done to determine the effectiveness of the 2 weight % Au—$TiO_2$ Hombikat catalyst in reducing CO and NO content in cigarette smoke. First, for comparative data, percentage levels of CO, $CO_2$, and $O_2$ and ppm levels of NO were measured in cigarette smoke. Then, percentage levels of CO, $CO_2$, and $O_2$ and ppm levels of NO were again measured after passing the cigarette smoke through catalyst bed(s) containing the 2 weight % Au—$TiO_2$ Hombikat catalyst.

In a first trial, a catalyst bed containing 100 mg of the 2 weight % Au—$TiO_2$ Hombikat catalyst with a particle size of 50 microns was placed 150 cm from the cigarette. At 60° C., the catalyst bed was effective in reducing CO and NO content by 69% and 94%, respectively.

In a second trial, dual catalyst beds placed 150 cm from the cigarette contained 200 mg (100 mg in each bed) of the 2 weight % Au—$TiO_2$ Hombikat catalyst with a particle size of 50 microns. At room temperature, the catalyst beds were effective in reducing CO and NO content by 32% and 40%, respectively.

In a third trial, a catalyst bed containing 240 mg of the 2 weight % Au—$TiO_2$ Hombikat catalyst with a particle size of 500-800 microns was placed 10 cm from the cigarette. At room temperature, the catalyst bed was effective in reducing CO and NO content by 20% and 12%, respectively.

In a fourth trial, the catalyst bed placed 10 cm from the cigarette contained 300 mg of the 2 weight % Au—$TiO_2$ Hombikat catalyst with a particle size of less than 500 microns. At room temperature, the catalyst bed was effective in reducing CO and NO content by 35% and 29%, respectively.

In a fifth trial, 150 mg of the 2 weight % Au—$TiO_2$ Hombikat catalyst with a particle size of 500-800 microns was placed in the cigarette filter. The catalyst was effective in reducing CO and NO content by 20% and 23%, respectively.

In a sixth trial, a catalyst bed containing 300 mg of regenerated 2 weight % Au—$TiO_2$ Hombikat catalyst with a particle size of 500-800 microns was placed 10 cm from the cigarette. At room temperature, the catalyst bed was effective in reducing CO and NO content by 35% and 25%, respectively. Used catalyst can be regenerated by exposure to 3-7% CO/balance Ar at 200° C. for 10 min, followed by exposure to air at room temperature for 1 hour.

Thus, using greater amounts of catalyst was found to be more effective in reducing CO and NO content in cigarette smoke, as were smaller catalyst particle sizes. However, in order to control the size of the catalyst particles and avoid high RTD, the catalyst particles are preferably pressed, sieved granules.

Silica hydrogel, also known as silica aquagel, is a silica gel formed in water. The pores of a silica hydrogel are filled with water. Xerogels and aerogels are examples of silica gel supports. An xerogel is a hydrogel with the water removed. An aerogel is a type of xerogel from which the liquid has been removed in such a way as to minimize collapse or change in the pore structure as the water is removed.

Use of silica gel supports, such as xerogels and/or aerogels, would avoid catalyst powder from being loose in the cigarette, thereby reducing potential for entrainment of catalyst powder. Additionally, use of silica gel supports, such as xerogels and/or aerogels, may prevent cigarette tobacco from drying out during storage of cigarettes.

Thus, the catalyst for the conversion of carbon monoxide to carbon dioxide may comprise noble metal nanoparticles on non-noble metal oxides incorporated in a silica gel support. Examples of silica gel supports suitable for use in the catalyst include, for example, xerogels, aerogels, and mixtures thereof. Examples of noble metal nanoparticles suitable for use in the catalyst include, for example, gold, palladium, platinum and mixtures thereof. Examples of non-noble metal oxides suitable for use in the catalyst include, for example, titania, alumina, ceria, zirconia, iron oxide, zinc oxide, magnesium oxide, and mixtures thereof. The noble metal nanoparticles on non-noble metal oxides may comprise, for example, 1-5 weight % gold-ceria, 2-5 weight % palladium-ceria, silver/silver oxide-ceria, copper oxide/zinc oxide-ceria, 20 weight % copper oxide-80 weight % Hombikat titania, 10 weight % copper oxide-10 weight % manganese oxide-80 weight % Hombikat titania. Preferably, the noble metal nanoparticles on non-noble metal oxides comprises 0.5-5 weight % gold-titania, more preferably 1-2 weight % gold-titania.

Accordingly, a further embodiment of the method of making a catalyst capable of converting carbon monoxide to carbon dioxide, which does not exhibit high RTD when incorporated in a cigarette filter, comprises incorporating noble metal nanoparticles deposited on non-noble metal oxides in a silica gel support. Examples of silica gel supports suitable for use in the method include, for example, xerogels, aerogels, and mixtures thereof.

Silica gel can be prepared by conventional means such as by mixing an aqueous solution of an alkali metal silicate (e.g., sodium silicate) with a strong acid such as nitric or sulfuric acid, the mixing being done under suitable conditions of agitation to form a clear silica sol which sets into a hydrogel. The resulting gel can be washed. The concentration of the $SiO_2$ in the hydrogel is usually in the range of about 10-60 weight %.

Washing can be accomplished simply by immersing the newly formed hydrogel in a continuously moving stream of water which leaches out the undesirable salts, leaving essentially pure silica ($SiO_2$). The pH, temperature, and duration of the wash can influence the physical properties of the silica particles, such as surface area and pore volume.

Metal organic decomposition (MOD) can be used to prepare nanoparticles or metal nanoparticles on metal oxides. The MOD process starts with a metal precursor containing the desired metallic element dissolved in a suitable solvent. For example, the process can involve a single metal precursor bearing one or more metallic atoms or the process can involve multiple single metallic precursors that are combined in solution to form a solution mixture.

Metal nanoparticles may be incorporated into the support by various methods, such as, for example, ion exchange, impregnation, physical admixture, deposition-precipitation, co-precipitation, in situ precipitation by urea hydrolysis, and/or hydrothermal methods. For example, the metal precursor may be dissolved or suspended in a liquid, and the support may be mixed with the liquid having the dispersed or suspended metal precursor. The dissolved or suspended metal precursor can be adsorbed onto a surface of the support or absorbed into the support. The metal precursor may also be deposited onto a surface of the support by removing the liquid, such as by evaporation so that the metal precursor remains on the support. The liquid may be substantially removed from the support during or prior to thermally treating the metal precursor, such as by heating the support at a temperature higher than the decomposition temperature of the precursor or by reducing the pressure of the atmosphere surrounding the support.

When the catalyst promotes oxidation of carbon monoxide, a significant reduction in the amount of carbon monoxide can be achieved under certain test conditions. Preferably, at room temperature (27-30° C.), greater than 25 weight % or greater than 50 weight % of carbon monoxide is oxidized, more preferably greater than 80 weight % of carbon monoxide is oxidized, even more preferably greater than 90 weight % of carbon monoxide is oxidized, and most preferably 100 weight % of carbon monoxide is oxidized using a gas stream of carbon monoxide in helium or argon, and oxygen.

It is contemplated that the catalyst may be incorporated into a cigarette filter component in an amount such that the amount of carbon monoxide in mainstream smoke is reduced during smoking of a cigarette. Preferably, the amount of the catalyst will be a catalytically effective amount, e.g., from about a few milligrams, for example, about 50 mg/cigarette, to about 350 mg/cigarette. More preferably, the amount of catalyst will be from about 100 mg/cigarette to about 200 mg/cigarette. Preferably, the catalyst will be incorporated in a cigarette in an amount effective to reduce carbon monoxide in mainstream smoke by at least 10%, preferably at least 20%, 30%, 40%, or 50% or more.

While various embodiments have been described, it is to be understood that variations and modifications may be resorted to as will be apparent to those skilled in the art. Such variations and modifications are to be considered within the purview and scope of the claims appended hereto.

What is claimed is:

1. A catalyst comprising noble metal nanoparticles on non-noble metal oxides incorporated in a porous support of mesoporous silica wherein the catalyst is catalytically active for oxidation of carbon monoxide and wherein the noble metal nanoparticles are selected from the group consisting of gold, palladium, platinum and mixtures thereof and the non-noble metal oxides are selected from the group consisting of titania, alumina, ceria, zirconia, iron oxide, zinc oxide, magnesium oxide, and mixtures thereof.

2. The catalyst of claim 1, wherein the mesoporous silica is selected from the group consisting of SBA-15, SBA-16, MCM-41, and MCM-48.

3. A catalyst comprising noble metal nanoparticles on non-noble metal oxides incorporated in a porous support wherein the catalyst is catalytically active for oxidation of carbon monoxide and wherein the noble metal nanoparticles are gold, the non-noble metal oxides are selected from the group consisting of ceria, zirconia, iron oxide, magnesium oxide, and mixtures thereof and the porous support is mesoporous silica.

4. The catalyst of claim 1, comprising 1-2 weight % gold-titania.

5. A cigarette comprising a filter containing the catalyst of claim 1.

6. A method of making a catalyst catalytically active for oxidation of carbon monoxide comprising:
   treating a catalyst comprising noble metal nanoparticles on non-noble metal oxides incorporated in a support to develop porosity in the support,
   wherein the noble metal nanoparticles are gold, the non-noble metal oxides are selected from the group consisting of ceria, zirconia, iron oxide, magnesium oxides, and mixtures thereof and the porous support is mesoporous silica.

7. The method of claim 6, wherein the catalyst is subjected to an oxidation treatment to develop porosity in the support by heating the catalyst in the presence of an oxidizing agent selected from the group consisting of steam, carbon dioxide, air and mixtures thereof.

8. A cigarette comprising a filter containing a catalyst, the catalyst comprising noble metal nanoparticles on non-noble metal oxides incorporated in a porous support,
   wherein the catalyst is catalytically active for oxidation of carbon monoxide, the noble metal nanoparticles are selected from the group consisting of gold, palladium, platinum and mixtures thereof, the non-noble metal oxides are selected from the group consisting of titania, alumina, ceria, zirconia, iron oxide, zinc oxide, magnesium oxide, and mixtures thereof, the support is selected from the group consisting of carbon beads, activated carbon, mesoporous silica, mesoporous titania, mesoporous alumina, and mesoporous ceria and the mesoporous silica is selected from the group consisting of SBA-15, SBA-16, MCM-41, and MCM-48.

* * * * *